(12) United States Patent
Klein et al.

(10) Patent No.: US 7,687,576 B2
(45) Date of Patent: Mar. 30, 2010

(54) THERMALLY HARDENING, TRANSPARENT COATING SUBSTANCE, METHOD FOR THE PRODUCTION THEREOF AND ITS USE

(75) Inventors: Günter Klein, Münster (DE); Ulrike Röckrath, Senden (DE); Jürgen Niemann, Münster (DE); Ulrich Poth, Münster (DE); Andre Brosseit, Hamm (DE); Karin Wermelt, Münster (DE); Alexandra Huber, Hamm (DE)

(73) Assignee: BASF Coatings AG, Munster (DE)

( * ) Notice: Subject to any disclaimer, the term of this patent is extended or adjusted under 35 U.S.C. 154(b) by 403 days.

(21) Appl. No.: 10/595,059

(22) PCT Filed: Jul. 10, 2004

(86) PCT No.: PCT/EP2004/007636

§ 371 (c)(1),
(2), (4) Date: Nov. 7, 2007

(87) PCT Pub. No.: WO2005/016985

PCT Pub. Date: Feb. 24, 2005

(65) Prior Publication Data

US 2008/0041274 A1 Feb. 21, 2008

(30) Foreign Application Priority Data

Aug. 2, 2003 (DE) ................. 103 35 491

(51) Int. Cl.
*C08F 8/00* (2006.01)
(52) U.S. Cl. .................. 525/131; 525/440.02; 524/197; 524/507; 524/539; 106/287.24
(58) Field of Classification Search ............ 106/287.25
See application file for complete search history.

(56) References Cited

U.S. PATENT DOCUMENTS

| 5,326,820 | A | 7/1994 | Hoffmann | |
| 5,508,337 | A | 4/1996 | Wamprecht | |
| 5,521,272 | A * | 5/1996 | O'Connor et al. | 528/45 |
| 5,869,566 | A | 2/1999 | Thomas | |
| 6,555,613 | B1 * | 4/2003 | Poth et al. | 524/589 |
| 6,822,038 | B1 * | 11/2004 | Gross et al. | 524/507 |
| 6,939,601 | B2 | 9/2005 | Neppl | |
| 7,122,595 | B1 * | 10/2006 | Ott et al. | 524/502 |

FOREIGN PATENT DOCUMENTS

| WO | WO92/02590 A1 | 2/1992 |
| WO | WO02/44237 A1 | 6/2002 |

OTHER PUBLICATIONS http://www.pfoa-facts.com/industry.html.*
Desmodur® BL 3175 Data Sheet.*
Vestanat® BL 1370 Data Sheet.*
http://www.degussa-nafta.com/north_america/en/products/productdatabase/default.htm?action=details&page=1&pid=39588&rno=18.*

* cited by examiner

*Primary Examiner*—David Wu
*Assistant Examiner*—Vu Nguyen
(74) *Attorney, Agent, or Firm*—Cantor Colburn LLP

(57) ABSTRACT

A thermosetting transparent coating material, its preparation and use. The coating includes (meth)acrylate (co)polymer having a number-average molecular weight of from 1,000 to 6,000 daltons, a glass transition temperature of −15 to +70° C., and a hydroxyl number of from 80 to 200 mg KOH/g; polyester having a number-average molecular weight of from 800 to 6,000 daltons, a hydroxyl number of from 80 to 200 mg KOH/g and an acid number of from 1 to 50 mg KOH/g, comprising, based on the polyester, from 30 to 70% by weight of cycloaliphatic structural units; a blocked polyisocyanate in which the blocked polyisocyanate groups are attached to flexibilizing structural units which, as part of a three-dimensional network, lower its glass transition temperature; and blocked polyisocyanate in which the blocked polyisocyanate groups are attached to hardening structural units which, as part of a three-dimensional network, raise its glass transition temperature.

23 Claims, No Drawings

THERMALLY HARDENING, TRANSPARENT COATING SUBSTANCE, METHOD FOR THE PRODUCTION THEREOF AND ITS USE

CROSS REFERENCE TO RELATED APPLICATIONS

This application is a National Phase Application based on PCT/PCT/EP 2004/007636, filed 10 Jul. 2004, which claims priority to DE 103 35 491, filed 2 Aug. 2003.

BACKGROUND OF THE INVENTION

The present invention relates to a new thermosetting transparent coating material. The present invention also relates to a new process for preparing a thermosetting transparent coating material. The present invention additionally relates to the use of the new thermosetting transparent coating material for producing coatings by the coil coating process.

Modern automobiles, especially top-class automobiles, have multicoat color and/or effect paint systems. These systems, as is known, comprise an electrocoat, a surfacer coat, antistonechip primer coat or functional coat, a color and/or effect basecoat, and a clearcoat. The multicoat paint systems are produced by means of what are termed wet-on-wet techniques, in which a clearcoat film is applied to a dried but not yet cured basecoat film and then at least basecoat film and clearcoat film are conjointly thermally cured. This process may also include the production of the electrocoat and of the surfacer, antistonechip primer or functional coat.

The multicoat color and/or effect paint systems are required to have what has been termed automobile quality. According to European Patent EP 0 352 298 B1, page 15, line 42, to page 17, line 14 this means that the multicoat paint systems in question score highly for (1) gloss, (2) distinctiveness of image (DOI, i.e., of the reflected image), (3) hiding power and uniformity thereof, (4) dry film thickness uniformity, (5) gasoline resistance, (6) solvent resistance, (7) acid resistance, (8) hardness, (9) abrasion resistance,

(10) scratch resistance,

(11) impact strength,

(12) intercoat and substrate adhesion, and

(13) weathering and UV stability.

Other important technological properties include

(14) high resistance to condensation,

(15) absence of any propensity toward blushing, and

(16) high stability toward tree resin and bird droppings.

The clearcoats in particular are marked by such essential technological properties as (1) gloss, (2) distinctiveness of image (DOI, i.e, of the reflected image), (5) gasoline resistance, (6) solvent resistance, (7) acid resistance, (8) hardness, (9) abrasion resistance,

(10) scratch resistance,

(13) weathering and UV stability,

(14) high resistance to condensation,

(15) resistance to blushing and

(16) stability toward tree resin and bird droppings.

The quality of the clearcoats is therefore subject to particularly stringent requirements.

However, particular requirements are also imposed on the technological properties of the clearcoat materials from which these clearcoats are produced. To start with they must provide the clearcoats in the requisite quality without problems and with outstanding reproducibility, and they must be preparable in a simple and outstandingly reproducible way.

The production of multicoat paint systems by the process described above is carried out on the line at the automaker's plant and involves a high level of complexity in terms of environmental considerations, process engineering, and apparatus, representing a significant portion of the production costs.

The automobile industry is therefore at pains to replace bodywork components, such as hood, trunk or doors, by components which are already painted in the vehicle color.

A most essential requirement for such a process, however, is that corresponding coated coils can be produced by means of the coil coating process and, in the painted state, can be brought into the desired form by means of shaping techniques, in particular by deep drawing, by the automaker or by the manufacturer of exterior mounted components.

Coil coating is the term used for a special form of roller coating (Römpp Lexikon Lacke und Druckfarben, Georg Thieme Verlag, Stuttgart, New York, 1998, page 617, "Roller Coating") and also, occasionally, the spray coating and flow coating of metal strips ("coils") with liquid coating materials. It is a continuous process, e.g. all operations such as cleaning, pretreatment, painting, and curing, etc., are conducted in one operation in one installation. Schematically, the steps involved in coil coating are as follows: The cleaning and degreasing of the coil are followed by a multistage chemical pretreatment with subsequent passivation, rinsing, and drying. Cooling is followed by the application of the liquid coating material to one or two sides using two or three rolls, usually by the reverse roller coating technique. After a very short evaporation time, the applied coat is thermally cured at temperatures from 180 to 260° C. for from 20 to 60 s. For the production of a multicoat paint system, application and curing are repeated. The speeds of coil coating lines are up to 250 m/min (Römpp Lexikon Lacke und Druckfarben, Georg Thieme Verlag, Stuttgart, New York, 1998, page 55, "Coil Coating").

The reason why attempts to transfer this inherently advantageous process to the automobile sector have so far essentially failed is that the clearcoat materials employed to date do not have the required automobile quality, even before deformation. In particular it is not possible to reproduce the shades and optical effects the automobile industry requires and the requisite gloss and overall appearance, since the coated coils have roller textures which are visible with the naked eye.

In coil coating processes, moreover, it is common to use clearcoat materials based on polyester binders and melamine resin crosslinking agents. Their good wetting and good leveling give these clearcoat materials good processing properties. Although the coatings produced from them are very flexible and lend themselves very well to deformation, they fail to meet the required automobile quality in terms of chemical resistance and weathering stability.

Clearcoat materials based on (meth)acrylate (co)polymer binders and blocked polyisocyanate crosslinking agents do usually give clearcoats of high automobile quality, particularly as regards gloss, hardness, and chemical resistance. Optimum leveling of the clearcoat materials and optimum weathering stability and distinctiveness of image can be achieved only by means of additives. The clearcoat materials cannot be used in the coil coating process owing to the relatively low flexibility of the clearcoats.

In order to utilize the advantages of the clearcoat materials based on (meth)acrylate (co)polymers and blocked polyisocyanates, and those of the clearcoats produced from them, in the coil coating process as well, German patent application DE 100 59 853 A 1 proposes a clearcoat material comprising (1) 10 to 70% by weight of a nonaqueous solution of an acrylate-based polymer having a hydroxyl number of between 100 and 250, (2) 10 to 70% by weight of a nonaqueous solution of a fluorine-modified polymer having a glass transition temperature of between 20 and 40° C., and (3) 20 to 60% by weight of at least one blocked aliphatic or cycloaliphatic polyisocyanate, and the weight ratio of components (1) to components (2) being not more than 1 and the sum of components (1), (2), and (3) being 100%, based on the binder content.

This known coating material does give transparent coatings which are of automobile quality in terms of gloss, hardness, flexibility, and chemical resistance. Owing to the comparatively poor wetting and the comparatively poor leveling, however, the known coating material does not have good processing properties. The coatings produced from them have the substantial disadvantage of including considerable amounts of fluorine compounds. Fluorine, however, is known to cause considerable problems in the recycling of old cars, especially when the bodywork is made of aluminum. Moreover, the coatings are difficult to overcoat, which causes considerable problems for automotive refinish. And, not least, the fluorine compounds are comparatively expensive, thus making the coating material and the coatings produced therefrom less attractive from an economic standpoint.

It is an object of the present invention to provide a new thermosetting transparent coating material which no longer has the disadvantages of the prior art but is instead free from organic fluorine compounds, so that the coated substrates produced from it, especially the aluminum-based automobile bodies, can be recycled without problems. The new thermosetting transparent coating material ought also to have particularly good wetting and particularly good leveling and therefore to have particularly good processing properties. In addition it should be able to be prepared using comparatively inexpensive constituents, so that it is advantageous from the standpoint not only of technology but also of economics.

The new thermosetting transparent coating material should be simple to prepare and lend itself advantageously to use in the coil coating process, to give transparent, in particular clear, coatings on coils, possessing the automobile quality, particularly in respect of gloss, surface smoothness, distinctiveness of image, hardness, weathering stability, and chemical resistance.

The new transparent, in particular clear, coatings ought also to have very good overcoatability, so that they can be refinished to very good effect.

After their processing by shaping, the precoated coils ought to continue to have the automobile quality, so that the coated shaped parts, as exterior mounted components, can be installed in correspondingly coated, larger units, especially correspondingly coated automobile bodies, without deleterious manifestation of a visual difference, particularly in the region of edges which abut one another.

SUMMARY OF THE INVENTION

The invention accordingly provides the novel thermosetting transparent coating material comprising, based in each case on (A), (B), (C), and (D), (A) from 10 to 40% by weight of at least one (meth)acrylate (co)polymer having a number-average molecular weight of from 1,000 to 6,000 daltons, a glass transition temperature of −15 to +70° C., and a hydroxyl number of from 80 to 200 mg KOH/g, (B) from 10 to 40% by weight of at least one polyester having a number-average molecular weight of from 800 to 6,000 daltons, a hydroxyl number of from 80 to 200 mg KOH/g and an acid number of from 1 to 50 mg KOH/g, comprising, based on the polyester, from 30 to 70% by weight of cycloaliphatic structural units, (C) from 10 to 40% by weight of at least one blocked polyisocyanate in which the blocked polyisocyanate groups are attached to at least one flexibilizing structural unit which, as part of the three-dimensional network, lowers its glass transition temperature, and (D) from 10 to 40% by weight of at least one blocked polyisocyanate in which at least one of the blocked polyisocyanate groups is attached to at least one hardening structural unit which, as part of the three-dimensional network, raises its glass transition temperature.

The novel thermosetting material is referred to below as "coating material of the invention".

The invention further provides the novel process for preparing the coating material of the invention by mixing constituents (A), (B), (C), and (D) and also, if desired, at least one additive (E) and homogenizing the resulting mixture.

The novel process for preparing the coating material of the invention is referred to below as "preparation process of the invention".

The invention further provides for the novel use of the coating material of the invention for producing transparent coatings by the coil coating process.

The novel use of the coating material of the invention is referred to below as "use in accordance with the invention".

In the light of the prior art it was surprising and unforeseeable for the skilled worker that the object on which the present invention was based could be achieved by means of the coating material of the invention, the preparation process of the invention, and the use in accordance with the invention.

In particular it was surprising that the coating material of the invention no longer had the disadvantages of the prior art but was instead free from organic fluorine compounds, so that the coated substrates produced from it, in particular the automobile bodies based on aluminum, were recyclable with no problems.

Furthermore, the novel thermosetting transparent coating material exhibited particularly good wetting and particularly good leveling and therefore had particularly good processing properties. It could also be prepared from comparatively inexpensive ingredients, so that it was advantageous from the standpoint not only of technology but also of economics.

The new thermosetting transparent coating material was easy to prepare and lent itself advantageously to use in the coil coating process, to give transparent, especially clear, coatings on coils, having the automobile quality, particularly in respect of gloss, surface smoothness, distinctiveness of image, hardness, weathering stability, and chemical resistance.

The new transparent, in particular clear, coatings, moreover, had very good overcoatability, and so could be refinished very effectively.

The precoated coils also continued to exhibit the automobile quality after their processing by shaping, so that the coated shaped parts could be installed as exterior mounted components into correspondingly coated, larger units, especially correspondingly coated automobile bodies, without any deleterious manifestation of a visual difference, in particular in the region of edges which abut one another.

The coating material of the invention could be prepared easily and very reproducibly by means of the preparation process of the invention.

All in all, the coating material of the invention made it possible, surprisingly, to transfer the coil coating process to the automobile sector.

DETAILED DESCRIPTION

The coating material of the invention comprises as first essential constituent, based in each case on (A), (B), (C), and (D), from 10 to 40% by weight, in particular from 10 to 35% by weight, of at least one, especially one, (meth)acrylate (co)polymer (A), preferably a (meth)acrylate copolymer (A), and in particular a methacrylate copolymer (A).

(A) has a number-average molecular weight of from 1,500 to 5,000 daltons, in particular from 1,000 to 6,000 daltons. It has a glass transition temperature of from −15 to +70° C., in particular from −15 to +60° C. Its hydroxyl number is from 80 to 200 mg KOH/g, in particular from 100 to 180 mg KOH/g. It can have an acid number of from 0 to 30 mg KOH/g.

(A) is prepared by free-radical (co)polymerization, in particular copolymerization, of free-radically polymerizable, olefinically unsaturated monomers.

Examples of suitable olefinically unsaturated monomers (a) for preparing the (meth)acrylate copolymers (A) are (a1) monomers which carry at least one hydroxyl group per molecule and whose use is obligatory, such as
hydroxyalkyl esters of acrylic acid, methacrylic acid or another alpha,beta-olefinically unsaturated carboxylic acid, which are derived from an alkylene glycol which is esterified with the acid, or which are obtainable by reacting the alpha,beta-olefinically unsaturated carboxylic acid with an alkylene oxide such as ethylene oxide or propylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl, 3-hydroxypropyl, 3-hydroxybutyl or 4-hydroxybutyl acrylate, methacrylate, ethacrylate, crotonate, maleate, fumarate or itaconate; or hydroxycyclo-alkyl esters such as 1,4-bis(hydroxymethyl)cyclohexane, octahydro-4,7-methano-1H-indenedimethanol or methylpropanediol monoacrylate, monomethacrylate, monoethacrylate, monocrotonate, monomaleate, monofumarate or monoitaconate; reaction products of cyclic esters, such as epsilon-caprolactone, and these hydroxyalkyl or hydroxycycloalkyl esters;

olefinically unsaturated alcohols such as allyl alcohol;

polyols such as trimethylolpropane monoallyl or diallyl ether or pentaerythritol monoallyl, diallyl or triallyl ether;

reaction products of acrylic acid and/or methacrylic acid with the glycidyl ester of an alpha-branched monocarboxylic acid having 5 to 18 carbon atoms per molecule, especially a Versatic® acid, or instead of the reaction product an equivalent amount of acrylic and/or methacrylic acid, which is then reacted during or after the polymerization reaction with the glycidyl ester of an alpha-branched mono-carboxylic acid having 5 to 18 carbon atoms per molecule, especially a Versatic® acid; and/or acryloxysilane-containing vinyl monomers, preparable by reacting hydroxy-functional silanes with epichlorohydrin and then reacting that reaction product with (meth)acrylic acid and/or hydroxyalkyl esters and/or hydroxycycloalkyl esters of (meth)acrylic acid and/or other hydroxyl-containing monomers (a1).

(a2) Monomers which carry either at least one acid group or at least one amino group per molecule, such as
acrylic acid, beta-carboxyethyl acrylate, methacrylic acid, ethacrylic acid, crotonic acid, maleic acid, fumaric acid or itaconic acid;

olefinically unsaturated sulfonic or phosphonic acids or their partial esters;

mono(meth)acryloyloxyethyl maleate, succinate or phthalate; or vinylbenzoic acid (all isomers), alpha-methylvinylbenzoic acid (all isomers) or vinylbenzenesulfonic acid (all isomers); and/or aminoethyl acrylate, aminoethyl methacrylate, allylamine or N-methylaminoethyl acrylate;

(a3) Monomers which are substantially or entirely free from reactive functional groups, such as:

Monomers (a31):

(Meth)acrylic esters which are substantially free from acid groups, such as (meth)acrylic alkyl or cycloalkyl esters having up to 20 carbon atoms in the alkyl radical, especially methyl, ethyl, n-propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indenemethanol or tert-butylcyclohexyl (meth)acrylate; (meth)acrylic oxaalkyl or oxacycloalkyl esters such as ethoxytri-glycol (meth)acrylate and methoxyoligoglycol (meth)acrylate having a molecular weight Mn of preferably 550 or other ethoxylated and/or propoxylated, hydroxyl-free (meth)acrylic acid derivatives (further examples of suitable monomers (31) of this kind are known from the laid-open specification DE 196 25 773 A1, column 3, line 65 to column 4, line 20). In minor amounts they may contain higher-functional (meth)acrylic alkyl or cycloalkyl esters such as ethylene glycol, propylene glycol, diethylene glycol, dipropylene glycol, butylene glycol, 1,5-pentanediol, 1,6-hexanediol, octahydro-4,7-methano-1H-indenedimethanol or cyclohexane-1,2-, -1,3- or -1,4-diol di(meth)acrylate; trimethylolpropane di- or tri(meth)acrylate; or pentaerythritol di-, tri- or tetra(meth)acrylate. In the context of the present invention, minor amounts of higher-functional monomers (a31) are amounts which do not lead to crosslinking or gelling of the copolymers, unless the intention is that they should be in the form of crosslinked microgel particles.

Monomers (a32):
Vinyl esters of alpha-branched monocarboxylic acids having 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may comprise branched and straight-chain acyclic and/or cycloaliphatic olefins. The reaction of such olefins with formic acid or with carbon monoxide and water produces a mixture of carboxylic acids in which the carboxyl groups are located predominantly on a quaternary carbon atom. Other olefinic starting materials are, for example, propylene trimer, propylene tetramer and diisobutylene. Alternatively, the vinyl esters may be prepared in a conventional manner from the acids; for example, by reacting the acid with acetylene. Particular preference, owing to their ready availability, is given to the use of vinyl esters of saturated aliphatic monocarboxylic acids having 9 to 11 carbon atoms which are branched on the alpha carbon atom. Vinyl esters of this kind are sold under the brand name VeoVa® (cf. also Römpp, op cit., page 598).

Monomers (a33):
Diarylethylenes, especially those of the general formula I:

$$R^1R^2C=CR^3R^4 \qquad (I),$$

in which the radicals $R^1$, $R^2$, $R^3$ and $R^4$ in each case independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals. Examples of suitable alkyl radicals are methyl, ethyl, propyl, isopropyl, n-butyl, isobutyl, tert-butyl, amyl, hexyl or 2-ethylhexyl. Examples of suitable cycloalkyl radicals are cyclobutyl, cyclopentyl or, cyclohexyl. Examples of suitable alkylcycloalkyl radicals are methylenecyclohexane, ethylenecyclohexane or propane-1,3-diylcyclohexane. Examples of suitable cycloalkylalkyl radicals are 2-, 3- or 4-methyl-, -ethyl-, -propyl- or -butylcyclohex-1-yl. Examples of suitable aryl radicals are phenyl, naphthyl or biphenylyl, preferably phenyl and naphthyl and especially phenyl. Examples of suitable alkylaryl radicals are benzyl or ethylene- or propane-1,3-diylbenzene. Examples of suitable cycloalkylaryl radicals are 2-, 3- or 4-phenylcyclohex-1-yl. Examples of suitable arylalkyl radicals are 2-, 3- or 4-methyl-, -ethyl-, -propyl- or -butylphen-1-yl. Examples of suitable arylcycloalkyl radicals are 2-, 3- or 4-cyclohexylphen-1-yl. The aryl radicals $R^1$, $R^2$, $R^3$ and/or $R^4$ are preferably phenyl or, naphthyl radicals, especially phenyl radicals. The substituents that may be present in the radicals $R^1$, $R^2$, $R^3$ and/or $R^4$ are electron-withdrawing or electron-donating atoms or organic radicals, especially halogen atoms, nitrile, nitro, partially or fully halogenated alkyl, cycloalkyl, alkylcycloalkyl, cycloalkylalkyl, aryl, alkylaryl, cycloalkylaryl, arylalkyl and arylcycloalkyl radicals; aryloxy, alkyloxy and cycloalkyloxy radicals; and/or arylthio, alkylthio and cycloalkylthio radicals. Diphenylethylene, dinaphthaleneethylene, cis- or trans-stilbene or vinylidene-bis(4-nitrobenzene), especially diphenylethylene (DPE), are particularly advantageous and so are used with preference. In the context of the present invention, the monomers (a33) are used in order to regulate the copolymerization advantageously such that batchwise free-radical copolymerization is also possible.

Monomers (a34):
Vinylaromatic hydrocarbons such as styrene, vinyltoluene or alpha-alkylstyrenes, especially alpha-methylstyrene.

Monomers (a35):
Nitriles such as acrylonitrile and/or methacrylonitrile;

Monomers (a36):
Vinyl compounds, especially vinyl halides and/or vinylidene dihalides, such as vinyl chloride, vinyl fluoride, vinylidene dichloride or vinylidene difluoride; N-vinyl amides such as vinyl-N-methylformamide, N-vinylcaprolactam or N-vinyl-pyrrolidone; 1-vinylimidazole; vinyl ethers such as ethyl vinyl ether, n-propyl vinyl ether, isopropyl vinyl ether, n-butyl vinyl ether, isobutyl vinyl ether and/or vinyl cyclohexyl ether; and/or vinyl esters such as vinyl acetate, vinyl propionate, vinyl butyrate, vinyl pivalate and/or the vinyl ester of 2-methyl-2-ethylheptanoic acid.

Monomers (a37):
Allyl compounds, especially allyl ethers and allyl esters such as allyl methyl, ethyl, propyl or butyl ether or allyl acetate, propionate or butyrate.

Monomers (a38):
Polysiloxane macromonomers having a number-average molecular weight Mn of from 1,000 to 40,000 and having on average from 0.5 to 2.5 ethylenically unsaturated double bonds per molecule; especially polysiloxane macromonomers having a number-average molecular weight Mn of from 2000 to 20,000, with particular preference from 2500 to 10,000, and in particular from 3000 to 7000 and having on average from 0.5 to 2.5, preferably from 0.5 to 1.5, ethylenically unsaturated double bonds per molecule, as are described in DE 38 07 571 A1 on pages 5 to 7, in DE 37 06 095 A1 in columns 3 to 7, in EP 0 358 153 B1 on pages 3 to 6, in U.S. Pat. No. 4,754,014 A1 in columns 5 to 9, in DE 44 21 823 A1 or in the international patent application WO 92/22615 on page 12, line 18 to page 18, line 10.

Monomers (a39):
Olefins such as ethylene, propylene, but-1-ene, pent-1-ene, hex-1-ene, cyclohexene, cyclopentene, norbornene, butadiene, isoprene, cyclopentadiene and/or dicyclopentadiene,
and/or (a4) Monomers containing epoxide groups, such as the glycidyl ester of acrylic acid, methacrylic acid, ethacrylic acid, crotonic acid, maleic acid, fumaric acid or itaconic acid or allyl glycidyl ether.

The carboxyl groups that may be present as a result of the copolymerization of carboxyl-containing monomers (a3) can serve as centers for polymer-analogous reactions with aromatic, aliphatic and/or cycloaliphatic compounds, especially cycloaliphatic compounds, containing epoxide groups. This produces secondary hydroxyl groups, and the glass transition temperature of (A) can be varied by means of the aromatic, aliphatic and/or cycloaliphatic groups, especially cycloaliphatic groups, introduced.

The epoxide groups that may be present as a result of the copolymerization of monomers (a3) containing epoxide groups can serve as centers for polymer-analogous reactions with aromatic, aliphatic and/or cycloaliphatic compounds, especially cycloaliphatic compounds, that contain carboxyl groups. Here again, this produces secondary hydroxyl groups, and the glass transition temperature of (A) can be varied by means of the aromatic, aliphatic and/or cycloaliphatic groups, especially cycloaliphatic groups, introduced.

Higher-functional monomers (a) of the type described above are generally used in minor amounts. By these are meant amounts which do not lead to crosslinking or gelling of the (meth)acrylate copolymers (A), unless the specific intention is to produce crosslinked polymeric microparticles.

The monomers (a) are selected, for preparing (A), such that (A) has the above-described parameters.

Examples of suitable preparation processes for (A) are described in the European patent application EP 0 767 185 A1, in the German patents DE 22 14 650 B1 and DE 27 49 576 B1 and in the American patents U.S. Pat. No. 4,091,048 A1, U.S. Pat. No. 3,781,379 A1, U.S. Pat. No. 5,480,493 A1, U.S. Pat. No. 5,475,073 A1, and U.S. Pat. No. 5,534,598 A1, or in the standard work Houben-Weyl, Methoden der organischen Chemie, 4th edition, volume 14/1, pages 24 to 255, 1961. Suitable reactors for the copolymerization include the customary and known stirred tanks, stirred tank cascades, tube reactors, loop reactors or Taylor reactors, such as are described, for example, in the patents and patent applications DE 1 071 241 B1, EP 0 498 583 A1, and DE 198 28 742 A1, or in the article by K. Kataoka in Chemical Engineering Science, volume 50, number 9, 1995, pages 1409 to 1416.

The coating material of the invention comprises as second essential constituents, based in each case on (A), (B), (C), and (D), from 10 to 40% by weight, in particular from 10 to 35% by weight, of at least one, especially one, polyester (B).

(B) has a number-average molecular weight of from 800 to 6,000 daltons, in particular from 1,000 to 5,500 daltons. Its hydroxyl number is from 80 to 200 mg KOH/g, in particular from 100 to 180 mg KOH/g. The acid number is from 1 to 50 mg KOH/g, in particular from 3 to 25 mg KOH/g.

For (B) it is essential that it contains, based on (B), from 30 to 40% by weight, in particular from 40 to 60% by weight, of cycloaliphatic structural units.

Suitable cycloaliphatic structural units are divalent or trivalent, especially divalent, cycloaliphatic radicals, including olefinically unsaturated cycloaliphatic radicals, or aliphatic radicals containing at least one cycloaliphatic radical, including one olefinically unsaturated cycloaliphatic radical.

Examples of suitable divalent cycloaliphatic radicals are substituted or unsubstituted, preferably unsubstituted, cycloalkanediyl radicals having 4 to 20 carbon atoms, such as cyclobutane-1,3-diyl, cyclopentane-1,3-diyl, cyclohexane-1, 2- -1,3- or -1,4-diyl, cyclohexene-1,2- -1,3- or -1,4-diyl, cycloheptane-1,4-diyl, norbornane-1,4-diyl, adamantane-1, 5-diyl, decalindiyl, 3,3,5-trimethylcyclohexane-1,5-diyl, 1-methylcyclohexane-2,6-diyl, dicyclohexylmethane-4,4'-diyl, 1,1'-dicyclohexane-4,4'-diyl or 1,4-dicyclohexylhexane-4,4"-diyl, especially 3,3,5-trimethylcyclohexane-1,5-diyl or dicyclohexylmethane-4,4'-diyl. The corresponding triyl radicals can be employed alongside these diyl radicals, but in minor amounts.

Examples of suitable divalent aliphatic radicals containing at least one cycloaliphatic radical are heptyl-1-pentylcyclohexane-3,4-bis(non-9-yl), cyclohexane-1,2-, 1,4- or -1,3-bis (methyl), cyclohexane-1,2-, -1,4- or -1,3-bis(eth-2-yl), cyclohexane-1,3-bis(prop-3-yl) or cyclohexane-1,2-, -1,4- or -1,3-bis(but-4-yl), and the corresponding cyclohexene derivatives.

The cycloaliphatic structural units described above can originate from the polyols, especially diols, used in the preparation of (B) and/or from the polycarboxylic acids, polycarboxylic anhydrides, polycarboxylic esters order polycarbonyl halides, especially dicarboxylic acids, dicarboxylic esters, and dicarboxylic anhydrides.

Examples of suitable cycloaliphatic and cyclic olefinic unsaturated dicarboxylic acids are 1,2-cyclobutanedicarboxylic acid, 1,3-cyclobutanedicarboxylic acid, 1,2-cyclopentanedicarboxylic acid, 1,3-cylopentanedicarboxylic acid, hexahydrophthalic acid, 1,3-cyclohexanedicarboxylic acid, 1,4-cyclohexanedicarboxylic acid, 4-methylhexahydrophthalic acid, tricyclodecanedicarboxylic acid, tetrahydrophthalic acid, 4-methyltetrahydrophthalic acid or polymeric fatty acids, especially those having a dimer content of more than 90% by weight, which are also referred to as dimer fatty acids. These dicarboxylic acids can be used both in their cis forms and in their trans forms and also as a mixture of both forms. Also suitable are the esters and anhydrides derived from them (where they exist).

Examples of suitable cycloaliphatic diols are 1,2-, 1,3- or 1,4-cyclohexanediol, 1,2-, 1,3- or 1,4-cyclohexanedimethanol or 1-dihydroxymethyl-bicyclo[2.2.1]heptane.

Otherwise it is possible to use the acyclic aliphatic and aromatic polycarboxylic acids, polycarboxylic an hydrides, polycarboxylic esters or polycarbonyl halides that are normally used in preparing polyesters, especially dicarboxylic acids, dicarboxylic esters and dicarboxylic anhydrides.

Examples of suitable aromatic dicarboxylic acids are phthalic acid, isophthalic acid, and terephthalic acid, phthalic, isophthalic, and terephthalic monosulfonate, and halophthalic acids, such as tetrachlorophthalic or tetrabromophthalic acid, of which terephthalic acid is advantageous and is therefore used with preference.

Examples of suitable acyclic aliphatic or unsaturated dicarboxylic acids are oxalic acid, malonic acid, succinic acid, glutaric acid, adipic acid, pimelic acid, suberic acid, azelaic acid, sebacic acid, undecanedicarboxylic acid or dodecanedicarboxylic acid or maleic, fumaric or itaconic acid.

Otherwise it is possible to use the acyclic aliphatic and aromatic polyols that are usually used in the preparation of polyesters, especially diols.

Examples of suitable diols are ethyleneglycol, 1,2- or 1,3-propanediol, 1,2-, 1,3- or 1,4-butanediol, diethyleneglycol, dipropyleneglycol, 1,2-, 1,3-, 1,4- or 1,5-pentanediol, 1,2-, 1,3-, 1,4-, 1,5- or 1,6-hexanediol, neopentyl hydroxypivalate, neopentylglycol, 1,2-, 1,3- or 1,4-cyclohexanediol, 1,2-, 1,3- or 1,4-cyclohexanedimethanol, trimethylpentanediol, ethylbutylpropanediol, the positionally isomeric diethyloctanediols, 2-butyl-2-ethylpropane-1,3-diol, 2-butyl-2-methylpropane-1,3-diol, 2-phenyl-2-methylpropane-1,3-diol, 2-propyl-2-ethylpropane-1,3-diol, 2-di-tert-butylpropane-1, 3-diol, 2-butyl-2-propylpropane-1,3-diol, 2,2-diethylpropane-1,3-diol, 2,2-dipropylpropane-1,3-diol, 2-cyclo-hexyl-2-methylpropane-1,3-diol, 2,5-dimethylhexane-2,5-diol, 2,5-diethylhexane-2,5-diol, 2-ethyl-5-methylhexane-2,5-diol, 2,4-dimethyl-pentane-2,4-diol, 2,3-dimethylbutane-2, 3-diol, 1,4-bis(2'-hydroxy-propyl)benzene, 1,3-bis(2-hydroxypropyl)benzene or the hydroxyl-functionalized alkanes described below.

The functionalized alkanes derive from branched, cyclic or acyclic alkanes having from 9 to 16 carbon atoms, which in each case form the parent structure.

Examples of suitable alkanes of this kind having 9 carbon atoms are 2-methyloctane, 4-methyloctane, 2,3-dimethylheptane, 3,4-dimethylheptane, 2,6-dimethylheptane, 3,5-dimethylheptane, 2-methyl-4-ethylhexane or isopropylcyclohexane.

Examples of suitable alkanes of this kind having 10 carbon atoms are 4-ethyloctane, 2,3,4,5-tetramethylhexane, 2,3-diethylhexane or 1-methyl-2-n-propylcyclohexane.

Examples of suitable alkanes of this kind having 11 carbon atoms are 2,4,5,6-tetramethylheptane or 3-methyl-6-ethyloctane.

Examples of suitable alkanes of this kind having 12 carbon atoms are 4-methyl-7-ethylnonane, 4,5-diethyloctane, 1'-ethylbutylcyclohexane, 3,5-diethyloctane or 2,4-diethyloctane.

Examples of suitable alkanes of this kind having 13 carbon atoms are 3,4-dimethyl-5-ethylnonane or 4,6-dimethyl-5-ethylnonane.

An example of a suitable alkane of this kind having 14 carbon atoms is 3,4-dimethyl-7-ethyldecane.

Examples of suitable alkanes of this kind having 15 carbon atoms are 3,6-diethylundecane or 3,6-dimethyl-9-ethylundecane.

Examples of suitable alkanes of this kind having 16 carbon atoms are 3,7-diethyldodecane or 4-ethyl-6-isopropylundecane.

Of these parent structures, the alkanes having from 10 to 14, and especially 12, carbon atoms are particularly advantageous and are therefore used with preference. Of these in turn the octane derivatives are particularly advantageous.

The functionalized alkanes generally have primary and/or secondary hydroxyl groups; preferably, primary and secondary groups are present.

The positionally isomeric dialkyloctanediols are particularly advantageous, especially the positionally isomeric diethyloctanediols.

The positionally isomeric diethyloctanediols which are preferred contain a linear $C_8$ carbon chain.

In terms of the two ethyl groups, the $C_8$ carbon chain has the following substitution pattern: 2,3, 2,4, 2,5, 2,6, 2,7, 3,4, 3,5, 3,6 or 4,5. In accordance with the invention it is of advantage if the two ethyl groups are in position 2,4, i.e., if the compounds are 2,4-diethyloctanediols.

Regarding the two hydroxyl groups, the $C_8$ carbon chain has the following substitution pattern: 1,2, 1,3, 1,4, 1,5, 1,6, 1,7, 1,8, 2,3, 2,4, 2,5, 2,6, 2,7, 2,8, 3,4, 3,5, 3,6, 3,7, 3,8, 4,5, 4,6, 4,8, 5,6, 5,7, 5,8, 6,7, 6,8 or 7,8. In accordance with the invention it is of advantage if the two hydroxyl groups are in position 1,5, i.e., if the compounds are diethyloctane-1,5-diols.

The two substitution patterns are combined with one another arbitrarily, i.e., such that the diethyloctanediols of particular advantage comprise 2,3-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 2,4-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 2,5-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 2,6-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, 4,6-, -4,7-, -4,8-, -5,6-, -5,7-, -5,8-, -6,7-, -6,8- or -7,8-diol, 2,7-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, 4,5-, -4,6-, -4,7-, -4,8-, -5,6-, -5,7-, -5,8-, -6,7-, -6,8- or -7,8-diol, 3,4-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, 4,6-, -4,7-, -4,8-, -5,6-, -5,7-, -5,8-, -6,7-, -6,8- or -7,8-diol, 3,5-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, 3,6-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol, or 4,5-diethyloctane-1,2-, -1,3-, -1,4-, -1,5-, -1,6-, -1,7-, -1,8-, -2,3-, -2,4-, -2,5-, -2,6-, -2,7-, -2,8-, -3,4-, -3,5-, -3,6-, -3,7-, -3,8-, -4,5-, -4,6-, -4,7-, -4,8-, -5,6-, -5,7-, -5,8-, -6,7-, -6,8- or -7,8-diol.

The positionally isomeric diethyloctanediols can be used as individual compounds or as mixtures of two or more diethyloctanediols.

Very particular advantages result from the use of 2,4-diethyloctane-1,5-diol.

The positionally isomeric diethyloctanediols used with preference are compounds which are known per se and can be prepared by means of customary and known synthesis methods in organic chemistry, such as base-catalyzed aldol condensation, or are obtained as byproducts of chemical industrial syntheses, such as the preparation of 2-ethylhexanol.

(B) is prepared by the known methods of esterification as described, for example, in the German patent application DE 40 24 204 A 1, page 4, lines 50 to 65. This reaction takes place normally at temperatures between 180 and 280° C., where appropriate in the presence of a suitable esterification catalyst, such as lithium octoate, dibutyltin oxide, dibutyltin dilaurate or para-toluenesulfonic acid, for example. It is also possible to use the heterogenous esterification catalysts known from German patent application DE 199 07 861 A 1.

The preparation of (B) can be conducted in the presence of small amounts of a suitable solvent as azeotrope former. Examples of azeotrope formers used include aromatic hydrocarbons, such as xylene in particular, and (cyclo)aliphatic hydrocarbons, e.g., cyclohexane or methyl-cyclohexane.

The coating material of the invention comprises as third essential constituent, based in each case on (A), (B), (C), and (D), from 10 to 40% by weight, in particular from 10 to 35% by weight, of at least one, especially one, blocked polyisocyanate (C) in which the blocked polyisocyanate groups are attached to at least one, preferably at least two, and in particular at least three flexibilizing structural unit(s). As part of a three-dimensional network, flexibilizing structural units lower its glass transition temperature.

The flexibilizing structural units are preferably divalent organic radicals. Preferably, the flexibilizing structural units are selected from the group consisting of divalent aliphatic hydrocarbon radicals and divalent, heteroatom-containing aliphatic hydrocarbon radicals.

Examples of suitable flexibilizing, divalent organic radicals of this kind are substituted or unsubstituted, preferably unsubstituted, linear or branched, preferably linear, alkanediyl radicals having from 4 to 30, preferably 5 to 20, and in particular 6, carbon atoms, which within the carbon chain may also contain cyclic groups, provided the carbon chains between the isocyanate groups and the cyclic groups contain in each case more than two carbon atoms.

Examples of highly suitable linear alkanediyl radicals are tetramethylene, pentamethylene, hexamethylene, heptamethylene, octamethylene, nonane-1,9-diyl, decane-1,10-diyl, undecane-1,11-diyl, dodecane-1,12-diyl, tridecane-1,13- diyl, tetradecane-1,14-diyl, pentadecane-1,15-diyl, hexadecane-1,16-diyl, heptadecane-1,17-diyl, octadecane-1,18-diyl, nonadecane-1,19-diyl or eicosane-1,20-diyl, preferably tetramethylene, pentamethylene, hexamethylene, heptamethylene, octamethylene, nonane-1,9-diyl, decane-1,10-diyl, especially hexamethylene.

Examples of highly suitable alkanediyl radicals which also contain cyclic groups in the carbon chain are 2-heptyl-1-pentylcyclohexane-3,4-bis(non-9-yl), cyclohexane-1,2-, -1,4- or -1,3-bis(eth-2-yl), cyclohexane-1,3-bis(prop-3-yl) or cyclohexane-1,2-, -1,4- or -1,3-bis(but-4-yl).

Further examples of suitable divalent organic radicals which contain heteroatoms are divalent polyester radicals comprising repeating polyester units of the formula —(—CO (CHR$^5$)$_m$—CH$_2$—O—)—. In this formula the index m is preferably from 4 to 6 and the substituent R$^5$ is hydrogen or an alkyl, cycloalkyl or alkoxy radical. No one substituent contains more than 12 carbon atoms.

Further examples of suitable divalent organic radicals which contain heteroatoms are divalent linear polyether radicals, preferably having a number-average molecular weight of from 400 to 5000, in particular from 400 to 3000. Highly suitable polyether radicals have the general formula -(—O—(CHR$^6$)$_o$—)$_p$O—, where the substituent R$^6$ is hydrogen or a lower, if appropriate substituted alkyl radical, the index o is from 2 to 6, preferably from 3 to 4, and the index p is from 2 to 100, preferably from 5 to 50.

Especially suitable examples are linear or branched polyether radicals derived from poly(oxyethylene) glycols, poly(oxypropylene) glycols, and poly(oxybutylene) glycols.

Also suitable, furthermore, are linear divalent siloxane radicals, as present, for example, in silicone rubbers; hydrogenated polybutadiene or polyisoprene radicals, random or alternating butadiene-isoprene copolymer radicals or butadiene-isoprene graft copolymer radicals, which may also contain styrene in copolymerized form, and also ethylene-propylene-diene radicals.

Suitable substituents include all organic functional groups that are substantially inert, i.e., which do not undergo reactions with the constituents of the coating materials of the invention.

Examples of suitable inert organic radicals are alkyl groups, especially methyl groups, halogen atoms, nitro groups, nitrile groups or alkoxy groups.

Of the above-described divalent organic radicals, the alkanediyl radicals containing no substituents and no cyclic groups in the carbon chain are of advantage and are therefore used with preference.

Examples of suitable blocked polyisocyanates (C) are the oligomers of diisocyanates, such as trimethylene diisocyanate, tetramethylene diisocyanate, pentamethylene diisocyanate, hexamethylene diisocyanate, heptamethylene diisocyanate, ethylethylene diisocyanate, trimethylhexane diisocyanate or acyclic aliphatic diisocyanates containing cyclic groups in their carbon chain, such as diisocyanates derived from dimer fatty acids, as sold under the commercial designation DDI 1410 by Henkel and described in the patents WO 97/149745 and WO 97/49747, especially 2-heptyl-3,4-bis(9-isocyanatononyl)-1-pentylcyclohexane, or 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane.

In the context of the present invention, owing to their two isocyanate groups attached exclusively to alkyl groups and despite their cyclic groups, the latter are included among the acyclic aliphatic diisocyanates. Of these diisocyanates, hexamethylene diisocyanate is used with particular preference.

It is preferred to use oligomers (C) that contain isocyanurate, urea, urethane, biuret, uretdione, iminooxadiazinedione, carbodiimide and/or allophanate groups. Examples of suitable preparation processes are known from the patents CA 2,163,591 A, U.S. Pat. No. 4,419,513 A, U.S. Pat. No. 4,454,317 A, EP 0 646 608 A, U.S. Pat. No. 4,801,675 A, EP 0 183 976 A1, DE 40 15 155 A1, EP 0 303 150 A1, EP 0 496 208 A1, EP 0 524 500 A1, EP 0 566 037 A1, U.S. Pat. No. 5,258,482 A1, U.S. Pat. No. 5,290,902 A1, EP 0 649 806 A1, DE 42 29 183 A1, EP 0 531 820 A1 or DE 100 05 228.

Also suitable is blocked nonyltriisocyanate (NTI) (C).

The coating material of the invention comprises as fourth essential constituent, based in each case on (A), (B), (C), and (D), from 10 to 40% by weight, in particular from 10 to 35% by weight, of at least one, especially one, blocked polyisocyanate (D) in which the blocked polyisocyanate groups are attached to at least one, preferably at least two and in particular at least three hardening structural unit(s). Hardening structural units, as part of a three-dimensional network, raise its glass transition temperature.

The hardening structural units are divalent or polyvalent organic radicals. Used with preference are divalent organic radicals.

Examples of highly suitable hardening structural units are
 divalent aromatic, cycloaliphatic and aromatic-cycloaliphatic radicals, in which within the blocked polyisocyanates (D) at least one linking bond leads directly to the cycloaliphatic and/or aromatic structural unit,
 and also divalent aliphatic radicals in which within the blocked polyisocyanates (D) the two linking bonds lead to methylene groups which are connected to an aromatic or cycloaliphatic, especially cycloaliphatic, structural unit.

The divalent cycloaliphatic, aromatic, and aliphatic radicals, especially the cycloaliphatic radicals, are advantageous and are used with preference.

Examples of suitable divalent aromatic radicals are substituted, especially methyl-substituted, or unsubstituted aromatic radicals having from 6 to 30 carbon atoms in the molecule, such as phen-1,4-, 1,3- or 1,2-ylene, naphth-1,4-, -1,3-, -1,2-, -1,5- or -2,5-ylene, propane-2,2-di(phen-4'-yl), methane-di(phen-4'-yl), biphenyl-4,4'-diyl or 2,4 or 2,6-tolylene.

Examples of suitable divalent cycloaliphatic radicals are substituted or unsubstituted, preferably unsubstituted, cycloalkanediyl radicals having from 4 to 20 carbon atoms, such as cyclobutane-1,3-diyl, cyclopentane-1,3-diyl, cyclohexane-1,3- or 1,4-diyl, cycloheptane-1,4-diyl, norbornane-1,4-diyl, adamantane-1,5-diyl, decalindiyl, 3,3,5-trimethylcyclohexane-1,5-diyl, 1-methylcyclohexane-2,6-diyl, dicyclohexylmethane-4,4'-diyl, 1,1'-dicyclohexane-4,4'-diyl or 1,4-dicyclohexylhexane-4,4"-diyl, especially 3,3,5-trimethylcyclohexane-1,5-diyl or dicyclohexylmethane-4,4'-diyl. In addition it is possible to use the corresponding triyl radicals in minor amounts.

Examples of suitable aliphatic radicals are cyclohexane-1,2-, -1,4- or -1,3-bis(methyl).

Examples of suitable substituents are those described above.

Examples of suitable blocked polyisocyanates (D) are the oligomers of diisocyanates, such as isophorone diisocyanate (i.e., 5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4- isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, 1,2-, 1,4- or 1,3-bis(isocyanatomethyl)cyclohexane, dicyclohexyl methane 2,4'-diisocyanate or dicyclohexylmethane 4,4'-diisocyanate, especially isophorone diisocyanate.

It is preferred to use oligomers (D) that contain isocyanurate, urea, urethane, biuret, uretdione, iminooxadiazinedione, carbodiimide and/or allophanate groups. Examples of suitable preparation processes are known from the patents CA 2,163,591 A, U.S. Pat. No. 4,419,513 A, U.S. Pat. No. 4,454,317 A, EP 0 646 608 A, U.S. Pat. No. 4,801,675 A, EP 0 183 976 A1, DE 40 15 155 A1, EP 0 303 150 A1, EP 0 496 208 A1, EP 0 524 500 A1, EP 0 566 037 A1, U.S. Pat. No. 5,258,482 A1, U.S. Pat. No. 5,290,902 A1, EP 0 649 806 A1, DE 42 29 183 A1, EP 0 531 820 A1 or they are described in the non prepublished German Application DE 100 05 228 2.

Suitable blocking agents for preparing the blocked polyisocyanates are those known from the U.S. Pat. No. 4,444,954 A:

i) phenols such as phenol, cresol, xylenol, nitrophenol, chlorophenol, ethylphenol, t-butylphenol, hydroxybenzoic acid, esters of this acid, or 2,5-di-tert-butyl-4-hydroxytoluene;

ii) lactams, such as ε-caprolactam, δ-valerolactam, γ-butyrolactam or β-propiolactam;

iii) active methylenic compounds, such as diethyl malonate, dimethyl malonate, ethyl or methyl acetoacetate or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazole, thiophenol, methylthiophenol or ethylthiophenol;

vi) acid amides such as acetoanilide, acetoanisidinamide, acrylamide, methacrylamide, acetamide, stearamide or benzamide;

vii) imides such as succinimide, phthalimide or maleimide;

viii) amines such as diphenylamine, phenyinaphthylamine, xylidine, N-phenylxylidine, carbazole, aniline, naphthylamine, butylamine, dibutylamine or butylphenylamine;

ix) imidazoles such as imidazole or 2-ethylimidazole;

x) ureas such as urea, thiourea, ethyleneurea, ethylenethiourea or 1,3-diphenylurea;

xi) carbamates such as phenyl N-phenylcarbamate or 2-oxazolidone;

xii) imines such as ethyleneimine;

xiii) oximes such as acetone oxime, formaldoxime, acetaldoxime, acetoxime, methyl ethyl ketoxime (butanone oxime), diisobutyl ketoxime, diacetyl monoxime, benzophenone oxime or chlorohexanone oximes;

xiv) salts of sulfurous acid such as sodium bisulfite or potassium bisulfite;

xv) hydroxamic esters such as benzyl methacrylohydroxamate (BMH) or allyl methacrylohydroxamate; or xvi) substituted pyrazoles, especially 3,5-dimethylpyrazole, or triazoles; and also xvii) mixtures of these blocking agents.

The blocked polyisocyanates (C) are preferably blocked with substituted pyrazoles, especially 3,5-dimethylpyrazole, and the blocked polyisocyanates (D) with oximes, especially butanone oxime.

The coating material of the invention is preferably composed of the essential constituents (A), (B), (C), and (D) as described above and also of at least one additive (E). The amount of additives (E) may vary very widely and is guided in particular by the function of (E).

Examples of suitable additives (E) are binders other than the above-described binders (A) and (B); crosslinking agents other than the above-described crosslinking agents (C) and (D); non-opaque pigments; molecularly dispersely soluble dyes; light stabilizers, such as UV absorbers and reversible free-radical scavengers (HALS); antioxidants; low-boiling and high-boiling ("long") organic solvents; devolatilizers; wetting agents; emulsifiers; slip additives; polymerization inhibitors; thermal crosslinking catalysts; thermolabile free-radical initiators; thermally curable reactive diluents; adhesion promoters; leveling agents; film formation auxiliaries; rheological assistants (thickeners and pseudoplastic sag control agents, SCAs); flame retardants; corrosion inhibitors; free-flow aids; waxes; siccatives; biocides and/or flatting agents; such as are described in detail, for example, in the textbook "Lackadditive" [Additives for coatings] by Johan Bieleman, Wiley-VCH, Weinheim, New York, 1998, or in the German patent application DE 199 14 896 A1, column 14, line 26, to column 15, line 46. For further details, refer also to DE 199 04 317 A1 and DE 198 55 125 A1.

In terms of its method, the preparation of the coating materials of the invention has no special features but instead takes place, preferably using the process of the invention, by mixing the above-described constituents (A), (B), (C), and (D) and also, where used, (E) and homogenizing the resulting mixtures with the aid of customary and known mixing techniques and apparatus such as stirred tanks, stirred mills, extruders, kneaders, Ultraturrax, inline dissolvers, static mixers, toothed ring dispersers, pressure release nozzles and/or microfluidizers.

The resulting coating materials of the invention are conventional coating materials, containing organic solvents, aqueous coating materials, substantially or entirely solvent-free and water-free liquid coating materials (100% systems), substantially or entirely solvent-free and water-free solid coating materials (powder coating materials), or substantially or entirely solvent-free powder coating suspensions (powder slurries). Preferably they are conventional coating materials.

They are outstandingly suitable for producing single-coat and multicoat clearcoats, and also multicoat color and/or effect coatings, in particular by the wet-on-wet technique, in which a basecoat material, especially an aqueous basecoat material, is applied to the surface of a substrate and then the resulting basecoat film, without being cured, is dried and overcoated with a clearcoat film. Thereafter the two films are cured together.

Surprisingly, the coating materials of the invention can also be applied by means of the coil coating process.

The applied coating materials of the invention are cured thermally on the coils. Heating may take place by means of convection, exposure to near or far infrared and/or, in the case of ferrous coils, by means of electrical induction. The peak metal temperature (PMT) is preferably 250° C.

The heating time, e.g. the duration of thermal curing, varies depending on the coating material of the invention that is used. It is preferably from 35 seconds to 2 minutes.

If essentially convection heating is employed, then at the preferred coil running speeds this requires forced-air ovens with a length of from 30 to 50 m, in particular from 35 to 45 m.

The resultant coated coils of the invention can be wound up and stored without problems until they are used further.

They are outstandingly suitable for producing shaped parts by shape-imparting processing, in particular by deep drawing.

The resultant shaped parts of the invention have automobile quality and are therefore outstandingly suitable as exterior mounted components for producing automobile bodies. On account of their particularly advantageous properties they are also suitable as commercial vehicle bodies and caravan bodies; in the household appliance sector, for example, for producing washing machines, dishwashers, dryers, refrigerators, freezers or ranges; in the lighting sector, for producing lamps for indoor and outdoor use; or in the construction sector, for both interior and exterior applications, for example, for producing ceiling elements and wall elements, doors, gates, pipe insulation, roller shutters or window profiles.

EXAMPLES

Preparation Example 1

The Preparation of a Methacrylate Copolymer (A)

A 5-liter Juvo vessel with heating jacket, and equipped with thermometer, stirrer, and reflux condenser, was charged with 913.5 g of Solvesso® 150. This initial charge was heated to 140° C. with stirring and blanketing with 200 cm$^3$/min nitrogen. Thereafter a mixture of 76.9 g of tert-butyl peroxy-2-ethylhexanoate and 48.1 g of Solvesso® 150 was run in from a dropping funnel at a uniform rate over the course of 4.75 hours (feed 1) 0.25 hour after the beginning of feed stream 1 a mixture of 250 g of cyclohexyl methacrylate, 153.9 g of n-butyl acrylate, 192.3 g of styrene, 173.1 g of hydroxyethyl methacrylate and 192.3 g of hydroxypropyl methacrylate was run in at a uniform rate over the course of 4 hours (feed 2). After the end of feed 2 the temperature was held at 140° C. for 2 more hours. The reaction mixture was then cooled to 80° C. and filtered through a 5 μm GAF bag filter. The resulting solution of the methacrylate copolymer (A) had a solid content of 50% by weight (1 hour/130° C.) and a viscosity of 8.7 dPas as measured in accordance with DIN 53018. The number-average molecular weight of the methacrylate copolymer (A) was 2,900 daltons, the glass transition temperature 44° C., the hydroxyl number 164 mg KOH/g, and the acid number 0 mg KOH/g.

Preparation Example 2

The Preparation of a Polyester (B)

A 5-liter Juvo vessel with heating jacket, and equipped with thermometer, stirrer, and reflux condenser, was charged with 218.5 g of terephthalic acid, 187.7 g of trimethylolpropane, 131.1 g of neopentylglycol, 268.9 g of dimethylolcyclohexane, 190.5 g of neopentylglycol hydroxypivalate, and 3% by weight, based on the total amount of the reaction mixture, of xylene as azeotrope former. This initial charge was heated to 180° C. with stirring and blanketing with 200 cm$^3$/min nitrogen, and then was slowly heated further to 200° C. under these conditions. When the major part of the terephthalic acid had undergone reaction and an acid number of 10 mg KOH/g had been reached, 503.3 g of hexahydrophthalic anhydride were added. The temperature of the reaction mixture was held at 200° C. until an acid number of 18 mg KOH/g was reached. Thereafter the reaction mixture was cooled to 150° C. and adjusted to a solids content of 75% by weight with 500 g of Solvesso® 150. It was then cooled to 80° C. and filtered through a 5 μm GAF bag filter. The resulting polyester (B) contained 51.5% by weight of cycloaliphatic structural units. Its acid number was 18.1 mg KOH/g, its hydroxyl number 136 mg KOH/g and its number-average molecular weight 2,500 daltons. The polyester (B) had a viscosity of 7 dPas as measured in accordance with DIN 53018 in the form of a 60% strength solution in Solvesso® 150.

Preparation Example 3

The Preparation of a Basecoat Material

Suitable mixing unit made of plastic was charged with 34.4 parts by weight of a commercial polyester (Uralac® ZW 5217 SN from DSM Deutschland GmbH, as a 68.4 percent strength solution in Dibasicester® from DuPont). With stirring, 58 parts by weight of a cellulose acetobutyrate solution (15 percent strength in 81.5% by weight butyl acetate and 3.5% by weight isotridecyl alcohol) and 6.6 parts by weight of a commercial blocked aliphatic polyisocyanate (Desmodur® BL 3370 from Bayer AG, 70 percent strength in methoxypropyl acetate) were added. The resulting mixture was admixed with 0.4 part by weight of a commercial leveling agent (Fisantrol® AC 2575 SM from DuPont Performance Coatings GmbH, in 100 percent form), 0.6 part by weight of a devolatilizer based on a copolymer of butyl acrylate and vinyl isobutyl ether (Acronal®) 700 L, 50 percent strength in ethyl acetate) and 1.2 parts by weight of a second devolatilizer based on a silicone-free polymer (Byk® 075 from Byk Chemie, 44 percent strength in alkylbenzenes and methoxypropyl acetate 8/1), 0.6 part by weight of dibutyltin dilaurate, and 52 parts by weight of Dibasicester®. Subsequently 4.3 parts by weight of aluminum effect pigment (Alpate® 8160N-AR from Toyal, 65 percent strength in white spirit and Solvesso® 100 1/1) and 4.2 parts by weight of aluminum effect pigment (Alpate® 7620 NS from Toyal, 69 percent strength in white spirit and Solvesso® 100 2.1/1) were pasted up in 9 parts by weight of diacetone alcohol and 9 parts by weight of Uralac® ZW 5217 SN. After 20 minutes the aluminum effect pigment preparation was added to the mixture described above, after which the resulting basecoat material was homogenized and adjusted with 6 parts by weight of dibutyl ether to a processing viscosity of from 100 to 110 seconds in the DIN 4 flow cup at 20° C.

Example 1

The Preparation of a Clearcoat Material

In a suitable mixing unit made of metal, 84.9 parts by weight of the methacrylate copolymer (A) solution from preparation example 1 were mixed with 40.4 parts by weight of the polyester (B) solution from preparation example 2. Added to the mixture were 65 parts by weight of a commercial aliphatic polyisocyanate based on hexamethylene diisocyanate and blocked with 3,5-dimethylpyrazole (Desmodur® LS 2253 from Bayer AG) and 84.4 parts by weight of a commercial cycloaliphatic polyisocyanate based on isophorone diisocyanate and blocked with butanone oxime (Desmodur BL 4265 from Bayer AG). The resulting mixture was admixed with 1.94 parts by weight of a UV absorber based on hydroxyphenyltriazine (Tinuvin® 400 from Ciba Specialty Chemicals), 1.94 parts by weight of a sterically hindered amine (HALS, Tinuvin® 292 from Ciba Specialty Chemicals), 0.97 part by weight of dibutyltin dilaurate, 0.84 part by weight of a polyester-modified polydimethylsiloxane leveling agent (Byk® 310 from Byk Chemie), and 0.84 part by weight of an alkyl-modified methylalkylpolysiloxane devolatilizer (Byk® 322 from Byk Chemie). The resulting clearcoat material was homogenized and adjusted with 70 parts by weight of methoxypropyl acetate to a processing viscosity of 100 seconds from the DIN 4 flow cup at 20° C.

Example 2

The Production of a Multicoat Paint System

The metal test panels were produced using the 0.8 mm galvanized, phosphated steel panels customary in the coil coatings industry, which had been coated with a commercial, deep-drawable anticorrosion primer from BASF Coatings AG with a film thickness of 10 μm. Atop this primer film the basecoat material of preparation example 3 was applied such that curing resulted in a dry film thickness of 17 μm. The basecoat film was cured at a PMT (peak metal temperature) of 241° C. The clearcoat material of example 1 was then applied to the resultant basecoat as two films, such that after curing at a PMT of 241° C. the result was a dry film thickness of 2×19 μm.

The leveling exhibited by the resultant multicoat paint system was outstanding. It was of high gloss. In the T-bend test in accordance with the ECCA test method, a precise description of which is given in ECCA-T7 (Reference Standards: EN 2370: 1991/EN ISO 1519, 1995/EN ISO 6860, 1995/ASTM D 522-93a) the test panels attained a T value of from 0.5 to 1.5. The chemical resistance was determined by means of a customary and known gradient oven test. For this purpose sulfuric acid, pancreatin, tree resin, and water were applied to the surface of the multicoat paint system. The test panels were placed in a preheated gradient oven. After heating, the test panels were rinsed off with water and a determination was made in each case of the temperature reached before there were any visible signs of damage to the paint surface:

| Sulfuric acid: | 51° C., |
|---|---|
| Pancreatin: | 48° C., |
| Tree resin: | 57° C. and |
| Water: | >75° C. |

The results underscored the fact that the clearcoat material of example 1 was very suitable for the coil coating process and gave multicoat paint systems in automobile quality.

Moreover, the shaped parts coated with the multicoat paint systems were recyclable and had very good overcoatability.

What is claimed is:

1. A thermosetting transparent curable coating composition comprising,
   (A) from 10 to 40% by weight of at least one (meth)acrylate (co)polymer having a number-average molecular weight of from 1,000 to 6,000 daltons, a glass transition temperature of −15 to +70° C., and a hydroxyl number of from 80 to 200 mg KOH/g, wherein the (meth)acrylate (co)polymer is not formed in the presence of component (B),
   (B) from 10 to 40% by weight of at least one polyester having a number-average molecular weight of from 800 to 6,000 daltons, a hydroxyl number of from 80 to 200 mg KOH/g and an acid number of from 1 to 50 mg KOH/g, comprising, based on the polyester, from 30 to 70% by weight of cycloaliphatic structural units,
   (C) from 10 to 40% by weight of at least one blocked polyisocyanate in which the blocked polyisocyanate groups are attached to at least one flexibilizing structural unit which, as part of a three-dimensional network, lowers its glass transition temperature, and
   (D) from 10 to 40% by weight of at least one blocked polyisocyanate in which at least one of the blocked polyisocyanate groups is attached to at least one hardening structural unit which, as part of a three-dimensional network, raises its glass transition temperature, wherein all % by weight are based on the total weight of (A), (B), (C), and (D).

2. The coating composition of claim 1, comprising based on (A), (B), (C), and (D), from 10 to 35% by weight of (A).

3. The coating composition of claim 1, comprising, based on (A), (B), (C), and (D), from 10 to 35% by weight of (B).

4. The coating composition of claim 1, comprising, based on (A), (B), (C), and (D), from 10 to 35% by weight of (C).

5. The coating composition of claim 1, comprising, based on (A), (B), (C), and (D), from 10 to 35% by weight of (D).

6. The coating composition of claim 1, wherein (A) has a number-average molecular weight of from 1,000 to 5,000 daltons.

7. The coating composition of claim 1, wherein (A) has a glass transition temperature from −15 to +60° C.

8. The coating composition of claim 1, wherein (A) has a hydroxyl number of from 100 to 180 mg KOH/g.

9. The coating composition of claim 1, wherein (B) has a number-average molecular weight of from 1,000 to 5,500 daltons.

10. The coating composition of claim 1, wherein (B) has a hydroxyl number of from 100 to 180 mg KOH/g.

11. The coating composition of claim 1, wherein (B) has an acid number of from 3 to 25 mg KOH/g.

12. The coating composition of claim 1, wherein (B) contains, based on (B), from 40 to 60% by weight of cycloaliphatic structural units.

13. The coating composition of claim 1, wherein the flexibilizing structural units of (C) are flexibilizing segments selected from the group consisting of divalent aliphatic hydrocarbon radicals and divalent, heteroatom-containing aliphatic hydrocarbon radicals.

14. The coating composition of claim 13, wherein the flexibilizing structural units are hexamethylene radicals.

15. The coating composition of claim 1, wherein the hardening structural units of (D) are selected from the group consisting of divalent and higher polyvalent cycloaliphatic radicals.

16. The coating composition of claim 15, wherein the cycloaliphatic radicals are isophorone radicals.

17. The coating composition of claim 1, wherein the blocking agents for the polyisocyanates (C) and (D) are selected from the group consisting of phenols, lactams, active methylenic compounds, alcohols, mercaptans, acid amides, imides, amines, imidazoles, ureas, carbamates, imines, oximes, salts of sulfurous acid, hydroxamic esters, and substituted pyrazoles and triazoles.

18. The coating composition of claim 17, wherein the polyisocyanates (C) are blocked with substituted pyrazoles.

19. The coating composition of claim 17, wherein the polyisocyanates (D) are blocked with oximes.

20. A process for preparing the thermally curable transparent coating composition of claim 1 comprising mixing constituents (A), (B), (C), and (D), and homogenizing the resulting mixture.

21. A coating comprising a coating composition according to claim 1, wherein said coating comprises an automotive clearcoat.

22. A method of coating a substrate, the method comprising applying a clear coat composition to a substrate, wherein the clear coat composition consists of the coating composition of claim 1.

23. The coating composition of claim 1 further comprising at least one additive (E).

* * * * *